(12) United States Patent
Nakao

(10) Patent No.: US 9,583,976 B2
(45) Date of Patent: Feb. 28, 2017

(54) POWER SUPPLY UNIT

(71) Applicant: FUJITSU LIMITED, Kawasaki-shi, Kanagawa (JP)

(72) Inventor: Hiroshi Nakao, Yamato (JP)

(73) Assignee: FUJITSU LIMITED, Kawasaki (JP)

( * ) Notice: Subject to any disclaimer, the term of this patent is extended or adjusted under 35 U.S.C. 154(b) by 406 days.

(21) Appl. No.: 14/333,265

(22) Filed: Jul. 16, 2014

(65) Prior Publication Data

US 2015/0048686 A1 Feb. 19, 2015

(30) Foreign Application Priority Data

Aug. 14, 2013 (JP) .................................. 2013-168590

(51) Int. Cl.
*H02J 1/00* (2006.01)
*H02J 9/06* (2006.01)
*H02J 3/00* (2006.01)

(52) U.S. Cl.
CPC .............. *H02J 9/062* (2013.01); *H02J 3/006* (2013.01); *H02J 9/061* (2013.01); *H02J 2009/068* (2013.01); *Y10T 307/696* (2015.04)

(58) Field of Classification Search
CPC .. H02J 9/062; H02J 9/061; H02J 3/006; H02J 2009/068; Y10T 307/696
See application file for complete search history.

(56) References Cited

U.S. PATENT DOCUMENTS

| 2004/0189094 A1 | 9/2004 | Hori | |
|---|---|---|---|
| 2013/0020872 A1* | 1/2013 | Kinnard | H02J 9/061 307/64 |

FOREIGN PATENT DOCUMENTS

| JP | 11-215705 A | 8/1999 |
|---|---|---|
| JP | 2004-254470 A | 9/2004 |

* cited by examiner

*Primary Examiner* — Daniel Cavallari
(74) *Attorney, Agent, or Firm* — Arent Fox LLP

(57) ABSTRACT

A power supply unit includes: a relay that includes a first input terminal to which primary alternating-current power is input and a second input terminal to which secondary alternating-current power is input, and outputs one of the primary alternating-current power and the secondary alternating-current power; a first power conversion unit that is coupled to an output terminal of the relay, and converts alternating-current power output from the relay, into direct-current power; a second power conversion unit that is coupled to an output side of the first power conversion unit and converts output power of the first power conversion unit into direct-current power of a predetermined voltage; a power output terminal that outputs the direct-current power converted by the second power conversion unit; and a control unit that couples the first input terminal to the output terminal or couples the second input terminal to the output terminal.

8 Claims, 10 Drawing Sheets

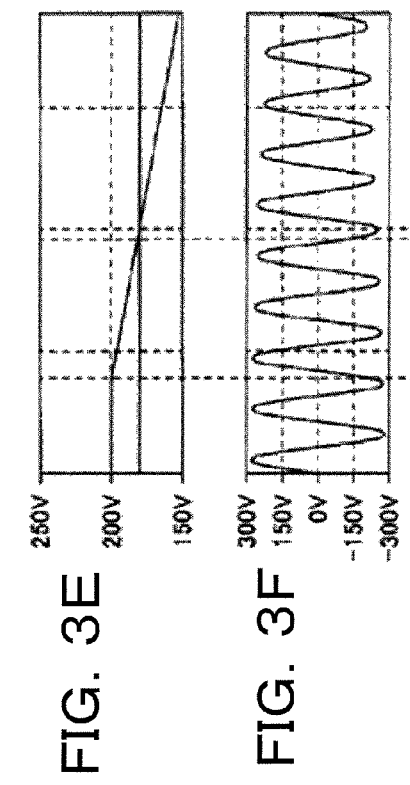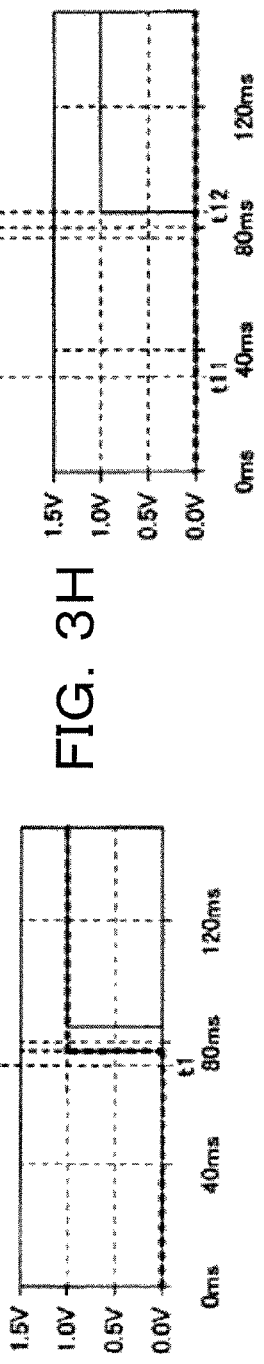
FIG. 3A FIG. 3B FIG. 3C FIG. 3D FIG. 3E FIG. 3F FIG. 3G FIG. 3H

POWER SUPPLY UNIT

CROSS-REFERENCE TO RELATED APPLICATION

This application is based upon and claims the benefit of priority of the prior Japanese Patent Application No. 2013-168590, filed on Aug. 14, 2013, the entire contents of which are incorporated herein by reference.

FIELD

The embodiments discussed herein are related to a power supply unit.

BACKGROUND

In the past, there has been an uninterruptible power supply unit that is connected to an apparatus including two types of power supply input and supplies two types of power supply to the apparatus. The uninterruptible power supply unit includes a first power supply input unit and a second power supply input unit, to which two respective types of power supply are input, and a first power supply output unit and a second power supply output unit, which output the respective power supplies input to the first power supply input unit and the second power supply input unit. The uninterruptible power supply unit further includes a control unit that detects power failure states of the power supplies input to the first power supply input unit and the second power supply input unit and causes, based on the detection result thereof, a backup power supply to be output from at least one power supply output unit of the first power supply output unit and the second power supply output unit.

By the way, in case that both the two types of power supply are put into power failures, the uninterruptible power supply unit of the related art includes a battery charged with direct-current power, and an inverter converting the direct-current power output from the battery into alternating-current power.

The following is a reference document.
[Document 1] Japanese Laid-open Patent Publication No. 2004-254470.

SUMMARY

According to an aspect of the invention, a power supply unit includes: a relay that includes a first input terminal to which primary alternating-current power is input and a second input terminal to which secondary alternating-current power is input, and outputs one of the primary alternating-current power and the secondary alternating-current power; a first power conversion unit that is coupled to an output terminal of the relay, and converts alternating-current power output from the relay, into direct-current power; a second power conversion unit that is coupled to an output side of the first power conversion unit and converts output power of the first power conversion unit into direct-current power of a predetermined voltage; a power output terminal that outputs the direct-current power converted by the second power conversion unit; and a control unit that couples the first input terminal to the output terminal when a voltage of output power of the first power conversion unit is greater than or equal to a predetermined threshold value, and couples the second input terminal to the output terminal when the voltage of the output power of the first power conversion unit becomes less than a predetermined threshold value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A to 3H are diagrams illustrating operation waveforms in a case where a power failure due to a high-speed power reduction or a power failure due to a low-speed power reduction occurs in one of the power supply units of the technical premise;

DESCRIPTION OF EMBODIMENTS

Here, before power supply units of first and second embodiments are described, a power supply unit of a technical premise will be described.

Figure 1A:
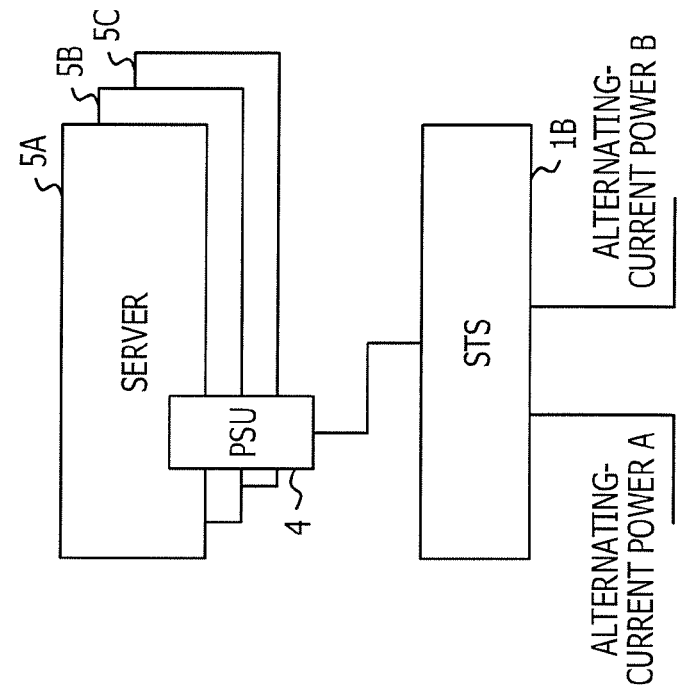
FIGS. 1A and 1B are diagrams each illustrating a power supply system utilizing a power supply unit of a technical premise.
Figure 1B:
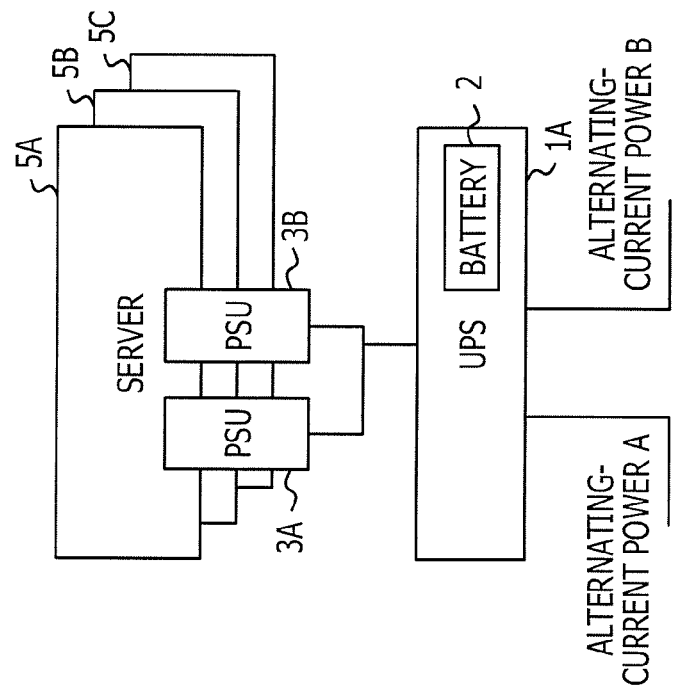

FIGS. 1A and 1B are diagrams each illustrating a power supply system utilizing a power supply unit of the technical premise. FIG. 1A illustrates a power supply unit 1A serving as an uninterruptible power supply unit (UPS), and FIG. 1B illustrates a power supply unit 1B serving as an uninterruptible power supply switching device (static transfer switch: STS).

Alternating-current power A and alternating-current power B of two types are input to each of the power supply units 1A and 1B illustrated in FIGS. 1A and 1B, and the power supply units 1A and 1B each output alternating-current power based on the alternating-current power A or B, as a power supply used for servers 5A to 5C.

In a case where electric power is supplied to the servers 5A to 5C, it is desirable to deal with an unexpected power failure or the like. Therefore, the two types of alternating-current power A and B supplied from different alternating-current power supplies are led into a power supply system.

Here, in a case where the alternating-current power A is interrupted by a power failure or the like when the alternating-current power A is used, a supply source of electric power for the servers 5A to 5C is switched from the alternating-current power A to the alternating-current power B.

In addition, in such a case, in order to switch alternating-current power without influencing the operations of the servers 5A to 5C, it is desirable to perform switching within a time comparable to a half cycle of the alternating-current power.

In a case where the frequency of the alternating-current power is, for example, 50 Hz, one cycle of the alternating-current power is 20 ms (millisecond). Therefore, switching from the alternating-current power A to the alternating-current power B is performed within a half cycle of 10 ms.

The power supply unit 1A illustrated in FIG. 1A contains a battery 2, and supplies alternating-current power to power supply units (PSUs) 3A and 3B. The PSUs 3A and 3B each convert alternating-current power supplied from the power supply unit 1A into direct-current power of a predetermined voltage, and supplies the direct-current power to the servers 5A to 5C.

At a normal time when a power failure or the like does not occur and both the two types of alternating-current power A and B are supplied, the power supply unit 1A outputs alternating-current power to the PSUs 3A and 3B with continuously charging the battery 2.

In addition, in a case where one of the two types of alternating-current power A and B is interrupted by a power failure or the like and it is difficult to output sufficient electric power or in a case where both the two types of alternating-current power A and B are interrupted by a power failure or the like, the power supply unit 1A converts electric power with which the battery 2 is charged, into an alternating current, and outputs to the PSUs 3A and 3B.

In addition, in the power supply system illustrated in FIG. 1A, the two PSUs 3A and 3B are provided on servers 5A to 5B sides, and direct-current power sources are redundant. It is possible to convert the alternating-current power supplied from the power supply unit 1A into a direct current using one of the PSUs 3A and 3B, and in a case where one thereof malfunctions owing to a failure, damage, or the like, it is possible to use the other.

Using such a power supply unit 1A as described above, it is possible to secure a power supply for the servers 5A to 5C even if one or both of the two types of alternating-current power A and B are interrupted owing to a power failure or the like. In addition, even if one of the PSUs 3A and 3B malfunctions owing to a failure, damage, or the like, it is possible to supply direct-current power using the other.

Accordingly, it is possible to establish a power supply system whose reliability is very high. In this regard, however, since the battery 2 and a converter converting the direct-current power into an alternating current are desired to be used, the power supply unit 1A is highly expensive.

The power supply unit 1B illustrated in FIG. 1B does not include the battery 2 in such a manner as the power supply unit 1A illustrated in FIG. 1A. Alternating-current power output from the power supply unit 1B is converted into direct-current power of a predetermined voltage in a PSU 4 provided on servers 5A to 5C sides, and supplied to the servers 5A to 5C.

In this way, since the power supply unit 1B does not include the battery 2, it is possible to simplify a configuration compared with the power supply unit 1A and achieve low cost. In addition, since usually it is unlikely that both the two types of alternating-current power A and B are interrupted, it is possible to secure sufficient reliability.

However, in the event that both the two types of alternating-current power A and B are interrupted, it becomes difficult to supply electric power to the servers 5A to 5C, the power supply unit 1B is inferior in reliability to the power supply unit 1A illustrated in FIG. 1A.

In addition, since only the PSU 4 is provided on the servers 5A to 5C sides, a redundant system is not established in such a manner as the PSUs 3A and 3B in FIG. 1A. Accordingly, while it is possible to achieve low cost, reliability in a converter converting alternating-current power into a direct current is inferior to the power supply system illustrated in FIG. 1A.

As described above, the power supply systems including the power supply units 1A and 1B illustrated in FIGS. 1A and 1B are used properly based on the uses or the like of the servers 5A to 5C. For example, in a case where the servers 5A to 5C are used in a data center or the like, the power supply systems including the power supply units 1A and 1B illustrated in FIGS. 1A and 1B are able to be used properly based on the degree of importance or the like of data.

In a case where the degree of importance of the servers 5A to 5C is very high, the power supply system including the power supply unit 1A illustrated in FIG. 1A may be used, and in a case where the degree of importance of the servers 5A to 5C is relatively low, the power supply system including the power supply unit 1B illustrated in FIG. 1B may be used.

In particular, in a case where the number of servers is valued more than the reliability of a power supply system, to use the power supply system including the power supply unit 1B illustrated in FIG. 1B has an advantage in terms of cost.

Next, the specific circuit configuration and operation of the power supply unit 1B will be described using FIG. 2 and FIGS. 3A to 3H.

Figure 2:
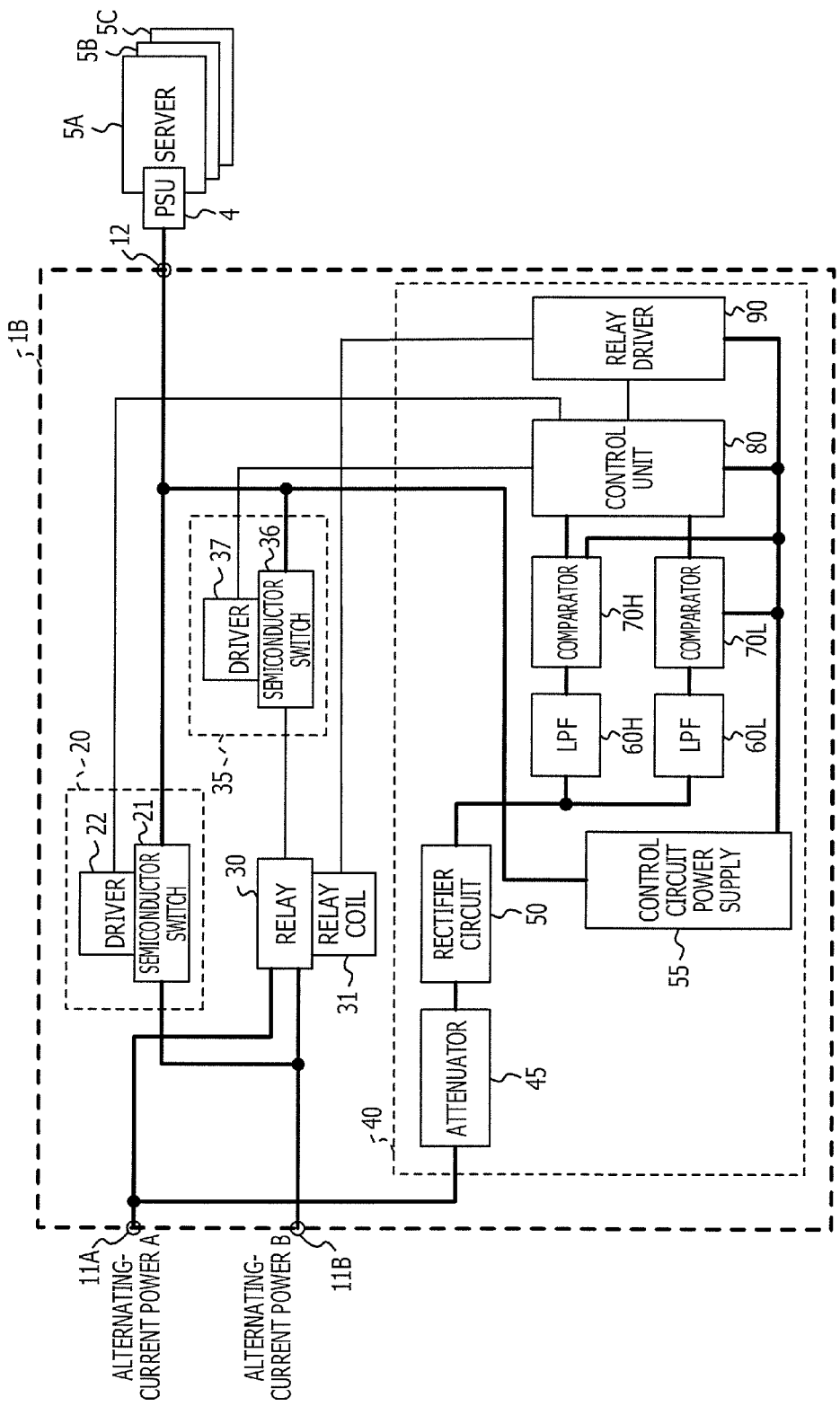
FIG. 2 is a diagram illustrating one of the power supply units of the technical premise.

FIG. 2 is a diagram illustrating a power supply system including the power supply unit 1B of the technical premise. FIG. 2 illustrates a power supply system where electric power is supplied from the power supply unit 1B to the three servers 5A to 5C through the one PSU 4.

The power supply unit 1B includes input terminals 11A and 11B, an output terminal 12, a semiconductor relay 20, a relay 30, a relay coil 31, a semiconductor relay 35, and a control circuit 40.

The input terminals 11A and 11B are terminals to which the two types of alternating-current power A and B are input, respectively. The input terminal 11A is connected to one of a pair of input terminals of the relay 30. The input terminal 11B is connected to an input terminal of the semiconductor relay 20 and the other input terminal of the relay 30.

The input terminals 11A and 11B are connected to two respective alternating-current power supplies different from each other. The two respective alternating-current power supplies output the two types of alternating-current power A and B.

In addition, hereinafter, the alternating-current power A is treated as primary alternating-current power supplied from a primary alternating-current power supply, and the alternating-current power B is treated as secondary alternating-current power supplied from a secondary alternating-current power supply.

In addition, a state where the alternating-current power A is interrupted by a power failure such as an instantaneous interruption or slow power reduction is referred to as a power failure time, and a normal state where no power failure occurs is referred to as a normal time. In addition, the operation of the power supply unit 1B at the normal time is referred to as a normal operation.

At the time of the normal operation, the power supply unit 1B outputs, from the output terminal 12, the alternating-current power A serving as the primary alternating-current power, and at the time of a power failure of the alternating-current power A, the power supply unit 1B outputs, from the output terminal 12, the alternating-current power B serving as the secondary alternating-current power.

The output terminal 12 is a terminal from which the power supply unit 1B outputs alternating-current power. The output terminal 12 is connected to output terminals of the semiconductor relay 20 and the relay 30.

The semiconductor relay 20 includes a semiconductor switch 21 and a driver 22. The semiconductor relay 20 is put into a non-conduction state at the time of the normal operation, and separates the input terminal 11B from the output terminal 12. At this time, the alternating-current power A input to the input terminal 11A is output from the output terminal 12 through the relay 30.

In addition, the semiconductor relay 20 is put into a conduction state when a power failure occurs in the alternating-current power A, and the semiconductor relay 20 connects the input terminal 11B to the output terminal 12.

The semiconductor switch 21 is realized using, for example, a solid-state relay. The solid-state relay separates the input terminal 11B from the output terminal 12 at the time of the normal operation, and connects the input terminal 11B to the output terminal 12 when a power failure occurs in the alternating-current power A.

The driver 22 is a drive unit driving the solid-state relay of the semiconductor switch 21. The driver 22 is driven by a control unit 80. Based on a control signal input from the control unit 80, the driver 22 drives the semiconductor switch 21 so as to separate the input terminal 11B from the output terminal 12 at the time of the normal operation, and drives the semiconductor switch 21 so as to connect the input terminal 11B and the output terminal 12 to each other at the time of a power failure of the alternating-current power A.

Such a semiconductor relay 20 is provided so as to swiftly switch the supply source of electric power for the output terminal 12 to the alternating-current power B in a case where it is difficult to switch the mechanical relay 30 at high speed when a power failure of the alternating-current power A occurs.

Therefore, the relay 20 is used when a power failure occurs in the alternating-current power A and the supply source of electric power is switched from the alternating-current power A to the alternating-current power B, and after the relay 30 connects the input terminal 11B and the output terminal 12 to each other, the relay 20 separates the input terminal 11B and the output terminal 12 from each other. The reason is that a loss becomes larger than the mechanical relay 30 if electric power is supplied through the semiconductor relay 20.

The relay 30 is inserted in series between the input terminals 11A and 11B and the output terminal 12. The relay 30 is a mechanical relay, and driven by the relay coil 31. The relay coil 31 is driven by a driving signal input from a relay driver 90.

The relay 30 connects the input terminal 11A and the output terminal 12 to each other at the time of the normal operation, and forms a path through which the alternating-current power A is output from the output terminal 12. In addition, the relay 30 connects the input terminal 11B and the output terminal 12 to each other at the time of a power failure so as to switch the supply source of electric power from the alternating-current power A to the alternating-current power B, and forms a path through which the alternating-current power B is output from the output terminal 12.

The semiconductor relay 35 includes a semiconductor switch 36 and a driver 37. The semiconductor relay 35 is inserted in series between the output terminal of the relay 30 and the output terminal 12. The semiconductor switch 36 is realized by, for example, a solid-state relay.

The semiconductor relay 35 is provided so as to avoid a short circuit between the input terminals 11A and 11B when switching between the semiconductor relay 20 and the relay 30 is performed at the time of a power failure of the alternating-current power A.

In other words, the semiconductor relay 35 is provided so as to avoid a short circuit between the input terminals 11A and 11B during an overlapping period between a time period during which the semiconductor relay 20 whose operation speed is high is conductively connected and a time period of being connected to the input terminal 11A before the switching of the relay 30 whose operation speed is low is completed when the semiconductor relay 20 is turned on and the connection of the relay 30 is switched from the input terminal 11A to the input terminal 11B.

The driver 37 in the semiconductor relay 35 is driven by the control unit 80, and put into a non-conduction state so as to coincide with a time when the semiconductor relay 20 is put into a conduction state. In addition, if the input terminal 11B and the output terminal 12 are connected to each other by the relay 30, the driver 37 in the semiconductor relay 35 is put into a conduction state so as to coincide with a time when the semiconductor relay 20 is put into a non-conduction state.

The control circuit 40 includes an attenuator 45, a rectifier circuit 50, a control circuit power supply 55, low pass filters (LPFs) 60H and 60L, comparators 70H and 70L, the control unit 80, and the relay driver 90.

In the attenuator 45, the self-input terminal is connected to the input terminal 11A, and the self-output terminal is connected to an input terminal of the rectifier circuit 50. The attenuator 45 voltage-divides (attenuates) and outputs the alternating-current power A input to the input terminal 11A.

The rectifier circuit 50 includes a diode bridge performing full-wave rectification, and full-wave rectifies and outputs an output voltage of the attenuator 45.

In the control circuit power supply 55, the self-input terminal is connected to output terminals of the semiconductor relay 20 and the relay 30, and the control circuit power supply 55 converts alternating-current power input through the semiconductor relay 20 or the relay 30 into a direct current, and supplies to the comparators 70H and 70L, the control unit 80, and the relay driver 90. In other words, the control circuit power supply 55 supplies electric power to the comparators 70H and 70L, the control unit 80, and the relay driver 90.

In each of the LPFs 60H and 60L, the self-input terminal is connected to an output terminal of the rectifier circuit 50, and a noise is removed from the output voltage of the rectifier circuit 50. As the noise, for example, a noise is cited that occurs when a switch of an alternating-current power supply outputting the alternating-current power A is turned on. The LPFs 60H and 60L are provided so as to suppress a malfunction of the power supply unit 1B.

Output terminals of the LPFs 60H and 60L are connected to one input terminal (inverting input terminal) of two input terminals of the comparator 70H and one input terminal (inverting input terminal) of two input terminals of the 70L, respectively.

The comparators 70H and 70L each include a pair of input terminals (the inverting input terminal and a non-inverting input terminal), and the output terminals of the LPFs 60H and 60L are connected to the respective inverting input terminals. In addition, predetermined threshold voltages generated based on direct-current power output from the control circuit power supply 55 are input to the respective non-inverting input terminals of the comparators 70H and 70L.

In the comparator 70H, a predetermined threshold voltage is set so as to be able to detect power reduction when power reduction at high speed, such as an instantaneous interruption, occurs in the alternating-current power A. The instantaneous interruption of the alternating-current power A may occur in a case where a breaker located relatively near the power supply unit 1B trips. In this way, the power reduction at high speed means that electric power is instantaneously interrupted in such a manner as the instantaneous interruption of electric power.

In addition, in the comparator 70L, a predetermined threshold voltage is set so as to be able to detect power reduction when power reduction at low speed occurs in the alternating-current power A. The power reduction at low speed may occur when, for example, an electric power substation or the like, located far away from the power supply unit 1B, is put into a power failure. If a power failure occurs at a point relatively distant from the power supply unit 1B, electric power is not instantaneously reduced, and is relatively slowly reduced. The reason is that the capacity of a power line or the like between a power failure point and the power supply unit 1B is large. In this way, the power reduction at low speed means that electric power is relatively slowly reduced.

The comparators 70H and 70L outputs results obtained by comparing voltages input to the inverting input terminals thereof from the output terminals of the LPFs 60H and 60L, respectively, with the respective predetermined threshold voltages, to the control unit 80. Outputs of the comparators 70H and 70L are at low (L) levels if the voltages input from the output terminals of the LPFs 60H and 60L, respectively, are greater than or equal to the respective predetermined threshold voltages.

The outputs of the comparators 70H and 70L are switched from the low (L) levels to high (H) levels if the voltages input from the output terminals of the LPFs 60H and 60L, respectively, become less than the respective predetermined threshold voltages.

The control unit 80 monitors comparison results input from the LPFs 60H and 60L, and monitors the presence or absence of a power failure due to power reduction at high speed or low speed in the alternating-current power A.

In a case where the control unit 80 determines that a power failure of the alternating-current power A occurs, the relay driver 90 outputs a driving signal for driving the relay coil 31. If the control unit 80 determines that a power failure of the alternating-current power A occurs, the relay driver 90 outputs, to the relay coil 31, the driving signal for switching an input source of alternating-current power for the relay 30 from the input terminal 11A to the input terminal 11B. As a result, in the relay 30, the input source of alternating-current power is switched so as to output the alternating-current power B to the output terminal 12.

In addition, in the above description, the power supply unit 1B adopting a circuit configuration utilizing the semiconductor relay 20 along with the relay 30 has been described. In a case where the amount of electric power supplied to the servers 5A to 5C connected to the output terminal 12 is large, it is desirable to use a relay whose capacity is large, as the mechanical relay 30.

For example, in the relay whose capacity is large, such as a relay whose rating is greater than or equal to 1 kW, it takes about 20 ms or more to switch an input destination, and the speed of an operation is low. There is a case where it becomes difficult to complete switching within a half cycle (for example, 10 ms) of the alternating-current power, using only the relay 30 in this way.

In the power supply unit 1B illustrated in FIG. 2, in order to realize high-speed switching in such a case, the semiconductor relays 20 and 35 capable of performing high-speed operations are provided along with the mechanical relay 30. In the power supply unit 1B illustrated in FIG. 2, if a power failure of the alternating-current power A occurs, the input terminal 11B and the output terminal 12 are connected to the semiconductor relay 20, and the input terminal 11B and the output terminal 12 are connected to the relay 30.

Since the switching operation of the mechanical relay 30 is slow, the alternating-current power B is supplied to the output terminal 12 through the semiconductor relay 20 immediately after switching. In addition, when the switching of the relay 30 is completed and an operation becomes stable, an input terminal may be separated from the output terminal 12 by switching the semiconductor relay 20.

In addition, in a case where, for example, the number of servers connected to the output terminal 12 is small and it is possible to use, as the mechanical relay 30, a relay whose capacity is small and which is capable of performing high-speed switching, the power supply unit 1B does not have to include the semiconductor relay 20. In this case, it is possible to omit the semiconductor relay 35.

FIGS. 3A to 3H are diagrams illustrating operation waveforms in a case where a power failure due to a high-speed power reduction or a power failure due to a low-speed power reduction occurs in the power supply unit 1B of the technical premise.

FIG. 3A is a diagram illustrating an effective value of the alternating-current power A in the input terminal 11A when a power failure due to the high-speed power reduction occurs, and FIG. 3B is a diagram illustrating an instantaneous voltage of the alternating-current power A corresponding to FIG. 3A.

FIG. 3C is a diagram illustrating a relationship between alternating-current waveforms input to the inverting input terminals of the comparators 70H and 70L and threshold voltages in the case of FIGS. 3A and 3B, and FIG. 3D is a diagram illustrating output waveforms of the comparators 70H and 70L.

In addition, in FIG. 3C, the predetermined threshold voltage of the comparator 70H is indicated by a thick dashed line (THH), and an alternating-current voltage input to the inverting input terminal of the comparator 70H is indicated by a thick dashed line. In addition, the predetermined threshold voltage of the comparator 70L is indicated by a thin solid line (THL), and an alternating-current voltage input to the inverting input terminal of the comparator 70L is indicated by a thin solid line.

In addition, in FIG. 3D, the output of the comparator 70H is indicated by a thick dashed line, and the output of the comparator 70L is indicated by a thin solid line. In addition, in FIGS. 3A to 3D, a horizontal axis is common, and a temporal axis.

As illustrated in FIG. 3A, the effective value of the alternating-current power A is about 200 V during a time period from a time of 0 ms to a time of 60 ms, and at this time, as illustrated in FIG. 3B, the instantaneous voltage of the alternating-current power A is an alternating-current voltage whose amplitude is 280 V.

In addition, at this time, as illustrated by the thick dashed line in FIG. 3C, an input voltage to the inverting input terminal of the comparator 70H is an alternating-current voltage higher than the threshold voltage THH (about 0.6 V) indicated by the thick dashed line. In addition, an input voltage to the inverting input terminal of the comparator 70L is about 4.5 V as indicated by the thin solid line, and higher than the threshold voltage THL (about 4.2 V) indicated by the thin solid line.

Therefore, as illustrated in FIG. 3D, the output voltages of the comparators 70H and 70L are at the L levels.

If an instantaneous interruption occurs in the alternating-current power A at a time t1 (about 72 ms) as illustrated in FIGS. 3A and 3B, the input voltage to the inverting input terminal of the comparator 70H becomes less than the threshold voltage THH (about 0.6 V) as illustrated in FIG. 3C, and the output of the comparator 70H becomes the H level as illustrated in FIG. 3D. From this, the instantaneous interruption of the alternating-current power A turns out to be detected by the comparator 70H.

In addition, as illustrated in FIG. 3C, if the input voltage to the inverting input terminal of the comparator 70L becomes less than the threshold voltage THL (about 4.2 V) around a time of 80 ms, the output of the comparator 70L becomes the H level (1.0 V) as illustrated in FIG. 3D.

The reason why the switching of the output of the comparator 70L is delayed compared with the comparator 70H is that it takes a longer time for the input voltage of the comparator 70L to fall below the threshold voltage THL than a time taken for the input voltage of the comparator 70H to fall below the threshold voltage THH, the threshold voltage THL being optimized for detecting the power reduction at low speed, the threshold voltage THH being optimized for detecting the power reduction at high speed.

In addition, FIG. 3E is a diagram illustrating an effective value of the alternating-current power A in the input terminal 11A when a power failure due to the low-speed power reduction occurs, and FIG. 3F is a diagram illustrating an instantaneous voltage of the alternating-current power A corresponding to FIG. 3E.

FIG. 3G is a diagram illustrating a relationship between alternating-current waveforms input to the inverting input terminals of the comparators 70H and 70L and threshold voltages in the case of FIGS. 3E and 3F, and FIG. 3H is a diagram illustrating output waveforms of the comparators 70H and 70L.

In addition, the predetermined threshold voltage THH (a thick dashed line) of the comparator 70H and the predetermined threshold voltage THL (a thin solid line) of the comparator 70L illustrated in FIG. 3G are the same as the threshold voltages THH and THL illustrated in FIG. 3C, respectively.

In addition, an alternating-current voltage input to the inverting input terminal of the comparator 70H is indicated by a thick dashed line, and an alternating-current voltage input to the inverting input terminal of the comparator 70L is indicated by a thin solid line.

In addition, in FIG. 3H, the output of the comparator 70H is indicated by a thick dashed line, and the output of the comparator 70L is indicated by a thin solid line. In addition, in FIGS. 3E to 3H, a horizontal axis is common, and a temporal axis.

As illustrated in FIGS. 3E to 3H, waveforms during a time period from a time of 0 ms to a time of 60 ms are the same as the waveforms illustrated in FIGS. 3A to 3D.

If power reduction at low speed occurs in the alternating-current power A at a time t11 (about 30 ms) as illustrated in FIG. 3E, the effective value is reduced by 10% and becomes 180 V at a time of about 80 ms. In a case of such power reduction at low speed, if the effective value is reduced by about 15% or more as an example, it is desirable to switch the alternating-current power.

In addition, the input voltage to the inverting input terminal of the comparator 70L becomes less than the threshold voltage THL (about 4.2 V) at a time t12 (about 88 ms) as illustrated in FIG. 3G, and the output of the comparator 70L becomes the H level (1.0 V) as illustrated in FIG. 3H. The threshold voltage THL (about 4.2 V) is a voltage corresponding to about 88% of the input voltage to one terminal of the comparator 70L when no power failure occurs. From this, the low-speed power reduction of the alternating-current power A turns out to be detected by the comparator 70L.

In addition, the input voltage to the inverting input terminal of the comparator 70H does not fall below the threshold voltage THH (about 0.6 V), as illustrated in FIG. 3G, and the output of the comparator 70H is maintained at the L level (0 V) as illustrated in FIG. 3H. In other words, the low-speed power reduction of the alternating-current power A is not detected by the comparator 70H.

A case where power reduction at low speed occurs in the alternating-current power A does not have to be dealt with as swiftly as in a case where power reduction at high speed occurs. However, so as to detect reduction in the amplitude of alternating-current power input to the inverting input terminal of the comparator 70L illustrated in FIG. 3G, the value of the threshold voltage THL differs greatly from the threshold voltage THH (see FIG. 3C) for detecting power reduction at high speed.

As described above, in the power supply unit 1B of the technical premise, so as to detect the high-speed power reduction of the alternating-current power A, the LPF 60H and the comparator 70H are desired, and so as to detect the low-speed power reduction of the alternating-current power A, the LPF 60L and the comparator 70L are desired.

Accordingly, the power supply unit 1B of the technical premise includes a large number of configuration elements and is difficult to realize using a simple configuration.

In addition, in a case where the amount of electric power output from the terminal 12 is large as in a case where the number of servers connected to the output terminal 12 is large, it is desirable to use the semiconductor relays 20 and 35 capable of performing high-speed operations, so as to supplement the switching of the mechanical relay 30 whose capacity is large and whose operation is slow.

In addition, in the power supply unit 1B, it is desirable to change the values of the threshold voltages THH and THL of the comparators 70H and 70L in response to, for example, the voltage value of the alternating-current power A, and in the same way, it is desirable to change the values of the threshold voltages THH and THL of the comparators 70H and 70L in response to the frequency of the alternating-current power A. Therefore, it is desirable to change the specification of the power supply unit 1B in response to the voltage value, the frequency, and so forth of the alternating-current power A.

Accordingly, hereinafter, power supply units of first and second embodiments will be described whose configurations are simpler than the power supply unit 1B of the technical premise and whose performance is superior thereto.

Hereinafter, embodiments to which a power supply unit of the present technology is applied will be described.

First Embodiment

Figure 4B:
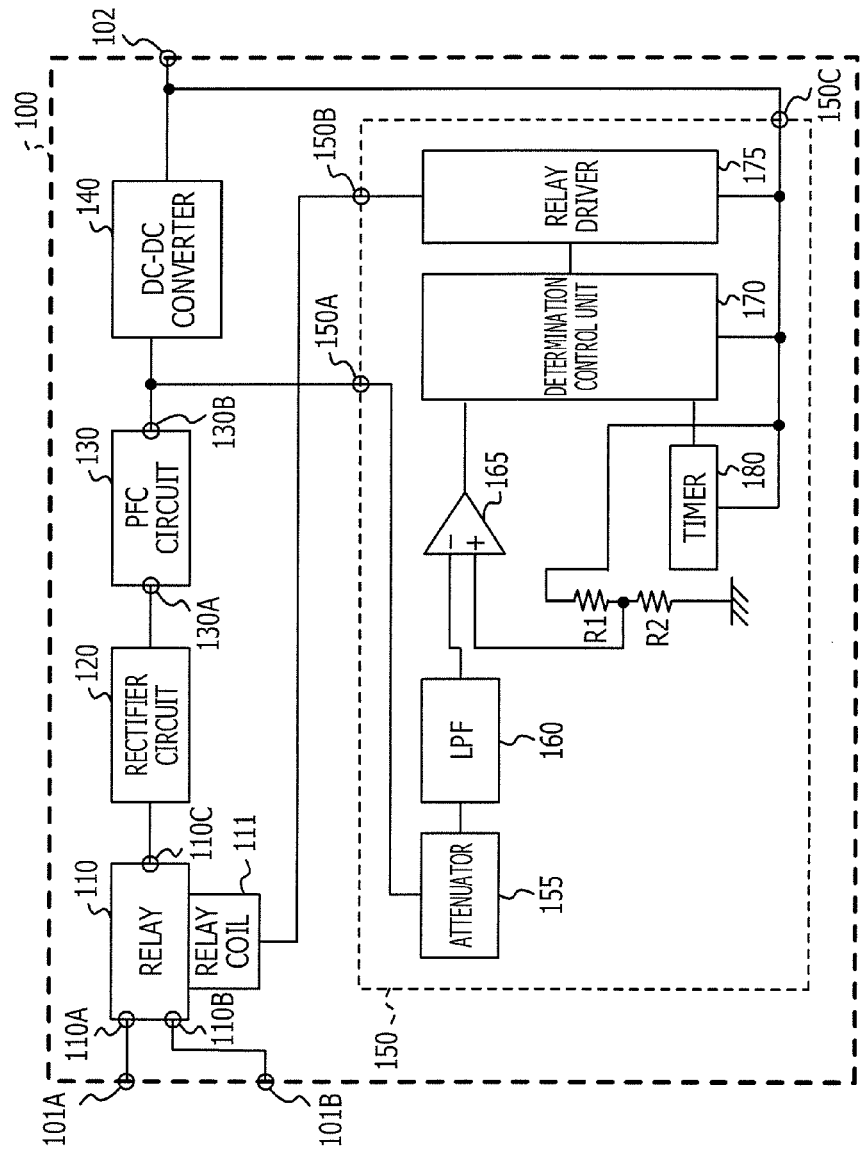
FIGS. 4A and 4B are diagrams illustrating a power supply unit of a first embodiment.
Figure 4A:
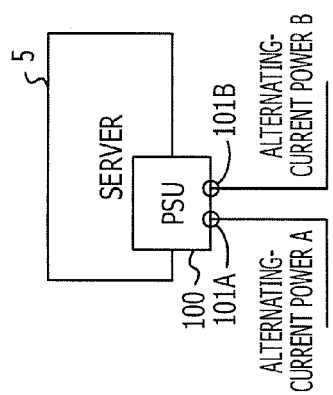

FIGS. 4A and 4B are diagrams illustrating of a power supply unit 100 of the first embodiment. The power supply unit 100 of the first embodiment is attached to a server 5, as a so-called power supply unit (PSU), and alternatively, provided proximal thereto. The alternating-current power A and the alternating-current power B are input to the power supply unit 100, and direct-current power of a predetermined voltage is supplied to the server 5.

The power supply unit 100 includes input terminals 101A and 101B, an output terminal 102, a relay 110, a relay coil 111, a rectifier circuit 120, a power factor correction (PFC) circuit 130, a direct current (DC)-DC converter 140, and a control circuit 150.

In addition, hereinafter, the alternating-current power A is treated as primary alternating-current power supplied from a primary alternating-current power supply, and the alternating-current power B is treated as secondary alternating-current power supplied from a secondary alternating-current power supply.

In addition, a state where the alternating-current power A is interrupted by a power failure such as an instantaneous interruption or slow power reduction is referred to as a power failure time, and a normal state where no power failure occurs is referred to as a normal time. In addition, the operation of the power supply unit 100 at the normal time is referred to as a normal operation.

In addition, an explanation will be made under the assumption that the frequencies of the alternating-current power A and the alternating-current power B are 50 Hz.

The primary alternating-current power supply and the secondary alternating-current power supply are connected to the input terminals 101A and 101B, respectively, and the alternating-current power A and the alternating-current power B are input to the input terminals 101A and 101B, respectively. Within the power supply unit 100, the input terminals 101A and 101B are connected to a pair of input terminals 110A and 110B of the relay 110, respectively. The input terminals 110A and 110B are examples of a first input terminal and a second input terminal, respectively.

The output terminal 102 is connected to an output terminal of the DC-DC converter 140 within the power supply unit 100, and a terminal outputting direct-current power of a predetermined voltage generated in the power supply unit 100. The output terminal 102 is connected to a terminal to which direct-current power for the server 5 is input. For example, the direct-current power of 12 V is output from the output terminal 102. The output terminal 102 is an example of a power output terminal.

The relay 110 is a mechanical relay, and includes the pair of input terminals 110A and 110B and an output terminal 110C. The input terminal 110A is connected to the input terminal 101A, and the input terminal 110B is connected to the input terminal 101B. The output terminal 110C is connected to an input terminal of the PFC circuit 130.

As an example, the relay 110 is a mechanical relay whose rating is about 0.5 kW and whose capacity is relatively small, and able to perform a high-speed switching operation within a time period less than a half cycle (10 ms) of the alternating-current power A. The mechanical relay whose capacity is small in this way is inexpensive compared with a mechanical relay whose capacity is large, a semiconductor relay, and so forth.

The relay 110 is driven by the relay coil 111. The relay coil 111 is driven by a driving signal input from a relay driver 175, and performs switching of the relay 110.

The relay 110 connects the input terminal 110A and the output terminal 110C to each other at the time of the normal operation, and if a power failure of the alternating-current power A occurs, the relay 110 is switched so as to connect the input terminal 110B and the output terminal 110C to each other.

In addition, if a timer 180 counts a predetermined time after the input terminal 110B and the output terminal 110C are connected to each other, the connection of the relay 110 is switched again, and the relay 110 connects the input terminal 110A and the output terminal 110C to each other. At this time, if the alternating-current power A has returned, the control circuit 150 holds a connection state between the input terminal 110A and the output terminal 110C, and if the alternating-current power A has not returned, the control circuit 150 further switches a connection, and connects the input terminal 110B and the output terminal 110C to each other.

An input terminal of the rectifier circuit 120 is connected to the output terminal 110C of the relay 110, and an output terminal thereof is connected to the input terminal of the PFC circuit 130. The rectifier circuit 120 includes four diodes connected in a bridge type, and full-wave rectifies and outputs alternating-current power (A or B) input from the relay 110, to the PFC circuit 130.

The PFC circuit 130 is a so-called power factor correction circuit, and includes an input terminal 130A and an output terminal 130B. The input terminal 130A is connected to the output terminal of the rectifier circuit 120, and the output terminal 130B is connected to an input terminal of the DC-DC converter 140 and an input terminal 150A of the control circuit 150.

In addition, the PFC circuit 130 has the same circuit configuration as a boost switching converter. The PFC circuit 130 boosts the voltage of electric power full-wave rectified in the rectifier circuit 120, corrects a power factor, and outputs direct-current power.

In addition, the rectifier circuit 120 and the PFC circuit 130 are an example of a first power conversion unit converting, into direct-current power, alternating-current power output from the relay 110. In addition, the PFC circuit 130 is an example of a power factor correction circuit.

Here, using FIGS. 5A to 5C, the operation of the PFC circuit 130 will be described.

Figure 5A:
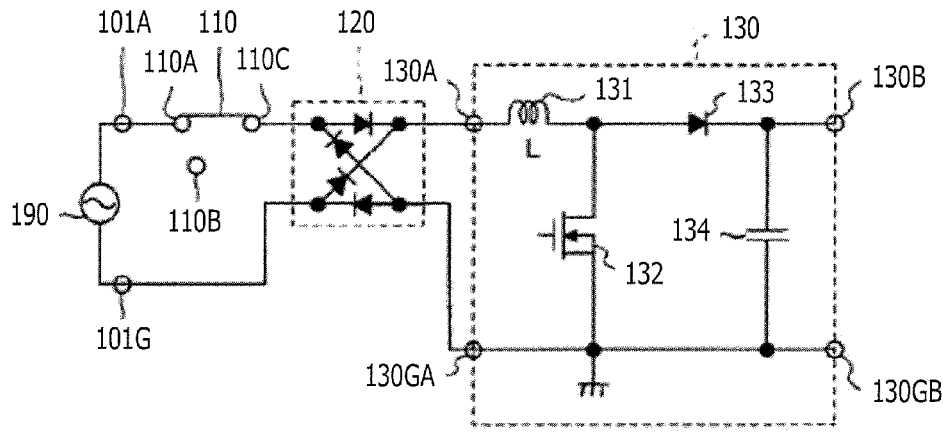
FIGS. 5A to 5C are diagrams illustrating a PFC circuit and a peripheral circuit in the power supply unit of the first embodiment, and waveforms of an input voltage, an input current, and an output voltage of the PFC circuit.
Figure 5B:
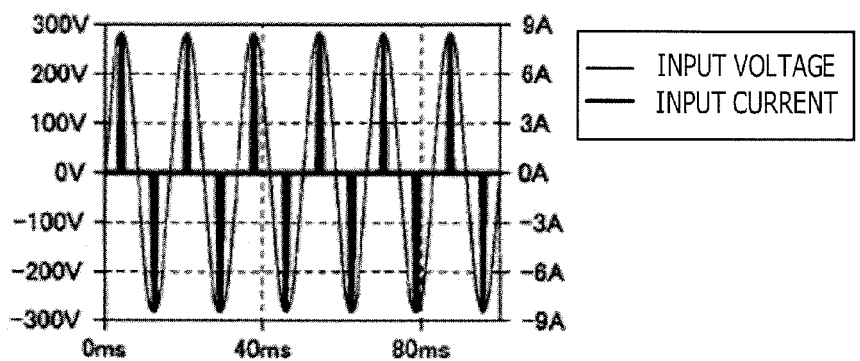
Figure 5C:
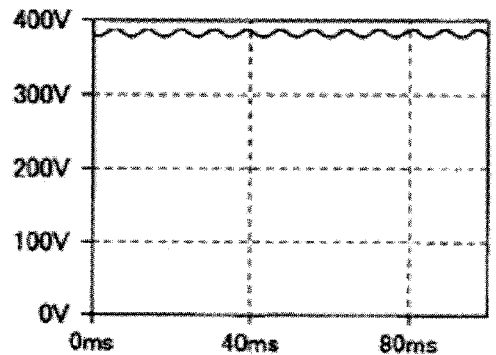

FIGS. 5A to 5C are diagrams illustrating the PFC circuit 130 and a peripheral circuit in the power supply unit 100 of the first embodiment, and waveforms of an input voltage, an input current, and an output voltage of the PFC circuit 130.

FIG. 5A illustrates an input terminal 101G, the relay 110, the rectifier circuit 120, and an alternating-current power supply 190 in addition to the PFC circuit 130. The input terminal 101G is an input terminal of a ground electric potential corresponding to the input terminal 101A, and the illustration thereof is omitted in FIGS. 4A and 4B. In addition, the alternating-current power supply 190 is a power supply outputting the alternating-current power A.

In FIG. 5A, the relay 110 is in a state where the input terminal 110A and the output terminal 110C are connected to each other, and the alternating-current power A input from the alternating-current power supply 190 is input to the rectifier circuit 120. As illustrated in FIG. 5A, the rectifier circuit 120 includes the four diodes connected in the bridge type.

The PFC circuit 130 includes input terminals 130A and 130GA, output terminals 130B and 130GB, a coil 131, an N-channel metal oxide semiconductor (NMOS) transistor 132, a diode 133, and a smoothing capacitor 134.

The input terminal 130GA and the output terminal 130GB are an input terminal of a ground electric potential and an output terminal of a ground electric potential, which correspond to the input terminal 130A and the output terminal 130B, respectively. The illustrations of the input terminal 130GA and the output terminal 130GB are omitted in FIGS. 4A and 4B.

The coil 131 and the diode 133 are connected in series between the input terminal 130A and the output terminal 130B. An anode of the diode 133 is connected to the coil 131, and a cathode thereof is connected to the output terminal 130B.

A drain of the NMOS transistor 132 is connected between the coil 131 and the anode of the diode 133, a source thereof is grounded, and a gate thereof is driven by a drive circuit within the PFC circuit 130.

One end (a terminal on an upper side in the drawing) of two ends of the smoothing capacitor 134 is connected between the cathode of the diode 133 and the output terminal 130B, and the other end thereof (a terminal on a lower side in the drawing) is grounded.

The PFC circuit 130 has such a circuit configuration as described above, corrects the power factor of input electric power, boosts the voltage of the input electric power, and outputs direct-current power.

As illustrated in FIG. 5B, as an example, while the input voltage of alternating-current power input between the input terminals 130A and 130GA changes in a sine wave-like fashion as indicated by a thin solid line, the input current of the alternating-current power indicated by a thick solid line flows only instantaneously, and a power factor is poor. The main reason is that a current flows only when a voltage value between the input terminals 130A and 130GA is higher than a voltage between both terminals of the smoothing capacitor 134.

In this way, even if the alternating-current power having the input voltage and the input current illustrated in FIG. 5B is input from the input terminals 130A and 130GA, it is possible to boost the voltage of electric power output from the rectifier circuit 120 and correct the power factor, using the PFC circuit 130, as illustrated in FIG. 5C.

In addition, while direct-current power illustrated in FIG. 5C includes a slight fluctuation component whose frequency is equal to the frequency of the original alternating-current power, the fluctuation component is negligible compared with the voltage value (about 380 V in FIG. 5C) of the direct-current power output from the PFC circuit 130.

The DC-DC converter 140 illustrated in FIGS. 4A and 4B steps down the voltage of the direct-current power output from the PFC circuit 130. Here, it is assumed that the direct-current power of 380 V is input from the PFC circuit 130 to the DC-DC converter 140, stepped down to 12 V, and output.

The reason why the direct-current power is stepped down to 12 V in the DC-DC converter 140 is that the voltage value of a direct-current voltage to be supplied to the server 5 (see FIG. 4A) connected to the output terminal 102 is 12 V. In addition, the DC-DC converter 140 is an example of a second power conversion unit.

The control circuit 150 includes the input terminal 150A, an output terminal 150B, a power supply input terminal 150C, an attenuator 155, an LPF 160, a comparator 165, a determination control unit 170, the relay driver 175, and the timer 180.

The input terminal 150A is connected to the output terminal 130B of the PFC circuit 130, and the direct-current voltage output from the PFC circuit 130 is input to the input terminal 150A.

The output terminal 150B is connected to an output terminal of the relay driver 175 within the control circuit 150, and connected to the relay coil 111 outside the control circuit 150. The control circuit 150 outputs the driving signal output by the relay driver 175, to the relay coil 111 through the output terminal 150B.

The power supply input terminal 150C is connected to the output terminal of the DC-DC converter 140, and is a terminal inputting the direct-current power output by the DC-DC converter 140, to the control circuit 150 as a power supply. Within the control circuit 150, the power supply input terminal 150C is connected to the comparator 165, the determination control unit 170, the relay driver 175, and the timer 180.

Part of the direct-current power output by the DC-DC converter 140 is supplied to the comparator 165, the determination control unit 170, the relay driver 175, and the timer 180 through the power supply input terminal 150C.

The attenuator 155 voltage-divides and outputs the direct-current voltage output by the PFC circuit 130, to the LPF 160. Here, as an example, the attenuator 155 voltage-divides (attenuates) the direct-current voltage output by the PFC circuit 130 into $\frac{1}{20}$, and outputs the voltage-divided voltage. In addition, the attenuator 155 is an example of an attenuation circuit.

The LPF 160 removes a noise from the output voltage of the attenuator 155. As the noise, there is, for example, a noise occurring when a switch in an another similar power supply unit connected to the alternating-current power supply outputting the alternating-current power A in parallel with the power supply unit 100 is turned on. In addition, the LPF 160 is provided so as to avoid the control circuit 150 from malfunctioning due to a voltage fluctuation associated with the turn-on of another similar power supply unit connected to the alternating-current power supply 190 (see FIG. 5) in parallel with the power supply unit 100, by removing, for example, a noise occurring when the other similar power supply unit connected to the alternating-current power supply 190 in parallel with the power supply unit 100 is turned on.

An output terminal of the LPF 160 is connected to an inverting input terminal of the comparator 165. In addition, a voltage-dividing circuit formed by resistors R1 and R2 is connected to a non-inverting input terminal of the comparator 165, and a predetermined threshold voltage is input thereto. The direct-current voltage input from the DC-DC converter 140 through the power supply input terminal 150C is voltage-divided by the voltage-dividing circuit formed by the resistors R1 and R2, and hence, the predetermined threshold voltage is generated.

In the comparator 165, a predetermined threshold voltage is set so as to be able to detect power reduction when power reduction at high speed or low speed occurs in the alternating-current power A. The comparator 165 in the power supply unit 100 of the first embodiment is able to detect both the high-speed power reduction and the low-speed power reduction of the alternating-current power A. The comparator 165 is an example of a comparator.

If a voltage value input to the inverting input terminal from the LPF 160 becomes less than the threshold voltage of a predetermined voltage input to the non-inverting input terminal, the comparator 165 outputs a signal of an H level. In other words, if high-speed or low-speed power reduction of the direct-current power A occurs and the voltage value input to the inverting input terminal becomes less than the threshold voltage of the predetermined voltage input to the non-inverting input terminal, the comparator 165 outputs the signal of the H level.

This means that the signal the comparator 165 outputs indicates the presence or absence of a power failure of the alternating-current power A.

In addition, the comparator 165 outputs a signal of an L level at the time of the normal operation of the power supply unit 100.

The determination control unit 170 monitors the signal level of the signal input from the comparator 165, and causes the relay driver 175 to output, to the relay coil 111, the driving signal of a signal level used for connecting the input terminal 110B and the output terminal 110C of the relay 110 to each other if the signal is switched from the L level to the H level. The determination control unit 170 is an example of a determination unit.

In addition, the timer 180 is connected to the determination control unit 170. When outputting, to the relay coil 111, the driving signal of a signal level used for connecting the input terminal 110B and the output terminal 110C of the relay 110 to each other, the determination control unit 170 causes the timer 180 to start counting.

For example, the timer 180 may be caused to start counting a predetermined time by the driving signal of the signal level the determination control unit 170 outputs to the relay coil 111. In addition, when having finished counting the predetermined time, the timer 180 may be caused to input, to the determination control unit 170, a signal indicating termination of counting.

In such a case, if the signal indicating the termination of counting has been input from the timer 180, the determination control unit 170 switches the driving signal again, and outputs, to the relay coil 111, the driving signal of a signal level used for connecting the input terminal 110A and the output terminal 110C of the relay 110 to each other.

As a result, direct-current power based on the alternating-current power A is output from the PFC circuit 130, and based on the signal the comparator 165 outputs, the determination control unit 170 determines the presence or absence of a power failure of the alternating-current power A.

If the power failure state of the alternating-current power A continues, the determination control unit 170 switches the signal level of the driving signal output from the relay driver 175 to the relay coil 111, and causes the input terminal 110B and the output terminal 110C of the relay 110 to be connected to each other.

If the alternating-current power A has returned from the power failure, the determination control unit 170 holds a state of connecting the input terminal 110B and the output terminal 110C of the relay 110 to each other, without switching the signal level of the driving signal output from the relay driver 175 to the relay coil 111.

In addition, such a determination control unit 170 may be realized using an integrated circuit (IC) chip or formed using a combinational circuit.

The relay driver 175 outputs, to the relay coil 111, the driving signal of a signal level based on an instruction from the determination control unit 170. The relay driver 175 is an example of a switching drive unit.

When the determination control unit 170 outputs, to the relay coil 111, the driving signal of the signal level used for connecting the input terminal 110B and the output terminal 110C of the relay 110 to each other, the same driving signal as the driving signal input to the relay coil 111 is input to the timer 180, and hence, the timer 180 starts counting.

In addition, when having finished counting the predetermined time, the timer 180 inputs, to the determination control unit 170, the signal indicating termination of counting. The predetermined time to be counted by the timer 180 may be set to an optimum time in response to an environment in which the power supply unit 100 is used, or the like.

Next, using FIGS. 6A to 6D, the operation of the power supply unit 100 of the first embodiment will be described.

FIGS. 6A to 6D are diagrams illustrating waveforms in a case where a power failure of the alternating-current power A occurs in the power supply unit 100 of the first embodiment.

Figure 6A:
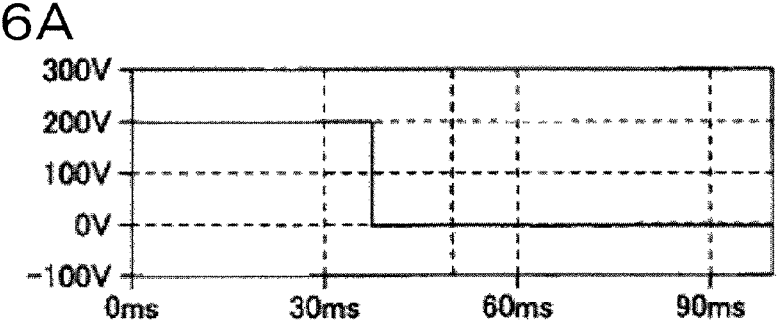
FIGS. 6A to 6D are diagrams illustrating waveforms in a case where a power failure of alternating-current power occurs in the power supply unit of the first embodiment.
Figure 6B:
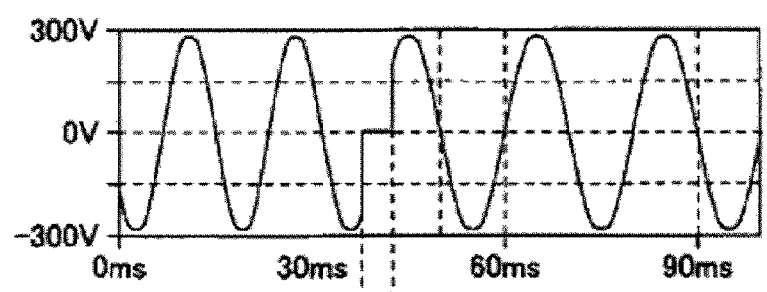

FIG. 6A is a diagram illustrating an effective value of the alternating-current power A in the input terminal 101A when a power failure due to high-speed power reduction occurs, and FIG. 6B is a diagram illustrating an instantaneous voltage of the alternating-current power A corresponding to FIG. 6A.

Figure 6C:
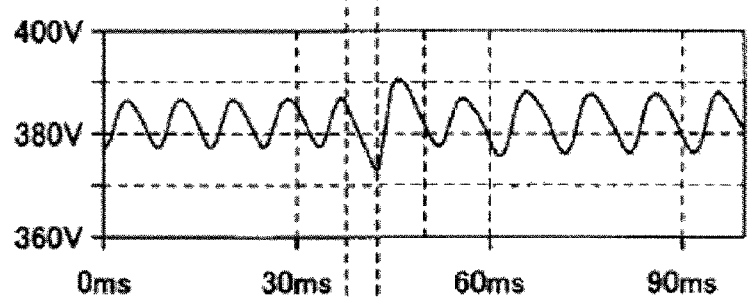
Figure 6D:
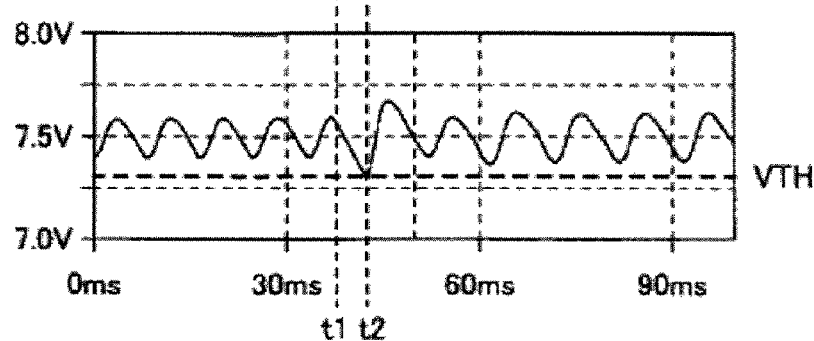

FIG. 6C is a diagram illustrating a direct-current power waveform the PFC circuit 130 outputs when the alternating-current power of FIGS. 6A and 6B is input, and FIG. 6D is a diagram illustrating a relationship between an alternating-current waveform input to the non-inverting input terminal of the comparator 165 in response to the output of the PFC circuit 130 illustrated in FIG. 6C and a threshold voltage.

As illustrated in FIG. 6A, the effective value of the alternating-current power A is about 200 V during a time period from a time of 0 ms to a time of 30 ms, and at this time, as illustrated in FIG. 6B, the instantaneous voltage of the alternating-current power A is an alternating-current voltage whose amplitude is 280 V.

In addition, at this time, the voltage value of the direct-current power the PFC circuit 130 outputs is about 380 V as illustrated in FIG. 6C, and an input voltage to the non-inverting input terminal of the comparator 165 is a direct-current voltage (about 7.5 V) higher than a threshold voltage VTH (about 7.2 V) indicated by a dashed line, as illustrated in FIG. 6D.

Therefore, while not illustrated in FIGS. 6A to 6D, the output voltage of the comparator 165 is at the L level.

In addition, if an instantaneous interruption occurs in the alternating-current power A at a time t1 as illustrated in FIGS. 6A and 6B, the voltage input to the non-inverting input terminal of the comparator 165 becomes less than the threshold voltage VTH at a time t2 immediately thereafter, as illustrated in FIG. 6D. Therefore, the relay 110 is switched at the time t2, and the input terminal 110B and the output terminal 110C are connected to each other.

In this way, when an instantaneous interruption occurs in the alternating-current power A, the relay 110 is swiftly switched. Therefore, as illustrated in FIGS. 6A and 6B, after the time t2, stable electric power is supplied by the alternating-current power B.

Figure 7:
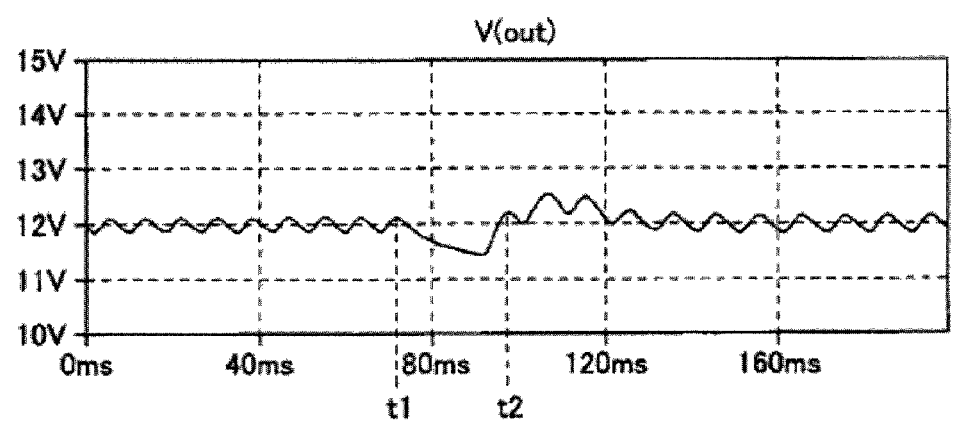
FIG. 7 is a diagram illustrating a waveform of a direct-current voltage output from an output terminal before and after an occurrence of a power failure in the alternating-current power in the power supply unit of the first embodiment.

FIG. 7 is a diagram illustrating a waveform of a direct-current voltage output from the output terminal 102 before and after an occurrence of a power failure in the alternating-current power A in the power supply unit 100 of the first embodiment. In addition, the waveform illustrated in FIG. 7 is a simulation result obtained under a condition that the timing of a power failure occurring in the alternating-current power A is different from the waveforms illustrated in FIGS. 6A to 6D.

As illustrated in FIG. 7, in a state prior to an occurrence of an instantaneous interruption in the alternating-current power A at a time t1, the voltage value of the direct-current power output from the output terminal 102 is stable at 12 V.

In addition, the direct-current power output from the output terminal 102 at a time t2 immediately after the occurrence of the instantaneous interruption in the alternating-current power A is approximately the same as that before the time t1, and it is understood that the power supply unit 100 of the first embodiment is able to output the stable direct-current power before and after the power failure.

In addition, here, the operation in a case where an instantaneous interruption occurs in the alternating-current power A has been described. However, in a case where power reduction at low speed occurs in the alternating-current power A, the power supply unit 100 of the first embodiment is able to switch the relay 110 by detecting a power failure in the same way and switch to the alternating-current power B.

The power supply unit 100 of the first embodiment full-wave rectifies the alternating-current power A input from the input terminal 101A, using the rectifier circuit 120, and converts the alternating-current power A into direct-current power using the PFC circuit 130. In addition, using the comparator 165, the control circuit 150 monitors a change in the voltage value of the direct-current power the PFC circuit 130 outputs.

Accordingly, in a case where power reduction at low speed occurs in the alternating-current power A, the voltage value of the direct-current power the PFC circuit 130 outputs is reduced. If the reduction of the voltage value of the direct-current power the PFC circuit 130 outputs is monitored by the comparator 165, it is possible to switch the relay 110 and output the alternating-current power B from the output terminal 102 in the same way as in the occurrence of the high-speed power reduction even in a case where the power reduction at low speed occurs in the alternating-current power A.

The threshold voltage VTH input to the non-inverting input terminal of the comparator 165 is about 7.2 V as illustrated in FIG. 6D, and the direct-current voltage input to the inverting input terminal of the comparator 165 from the LPF 160 before the occurrence of the high-speed or low-speed power reduction is about 7.5 V.

Therefore, when the effective value of the alternating-current power A is reduced by about 5%, it is possible to detect the low-speed power reduction of the alternating-current power A.

In addition, the threshold voltage VTH of the comparator 165 may be optimized so as to be able to reliably detect a case of the occurrence of the high-speed power reduction and a case of the occurrence of the low-speed power reduction.

Figure 8:
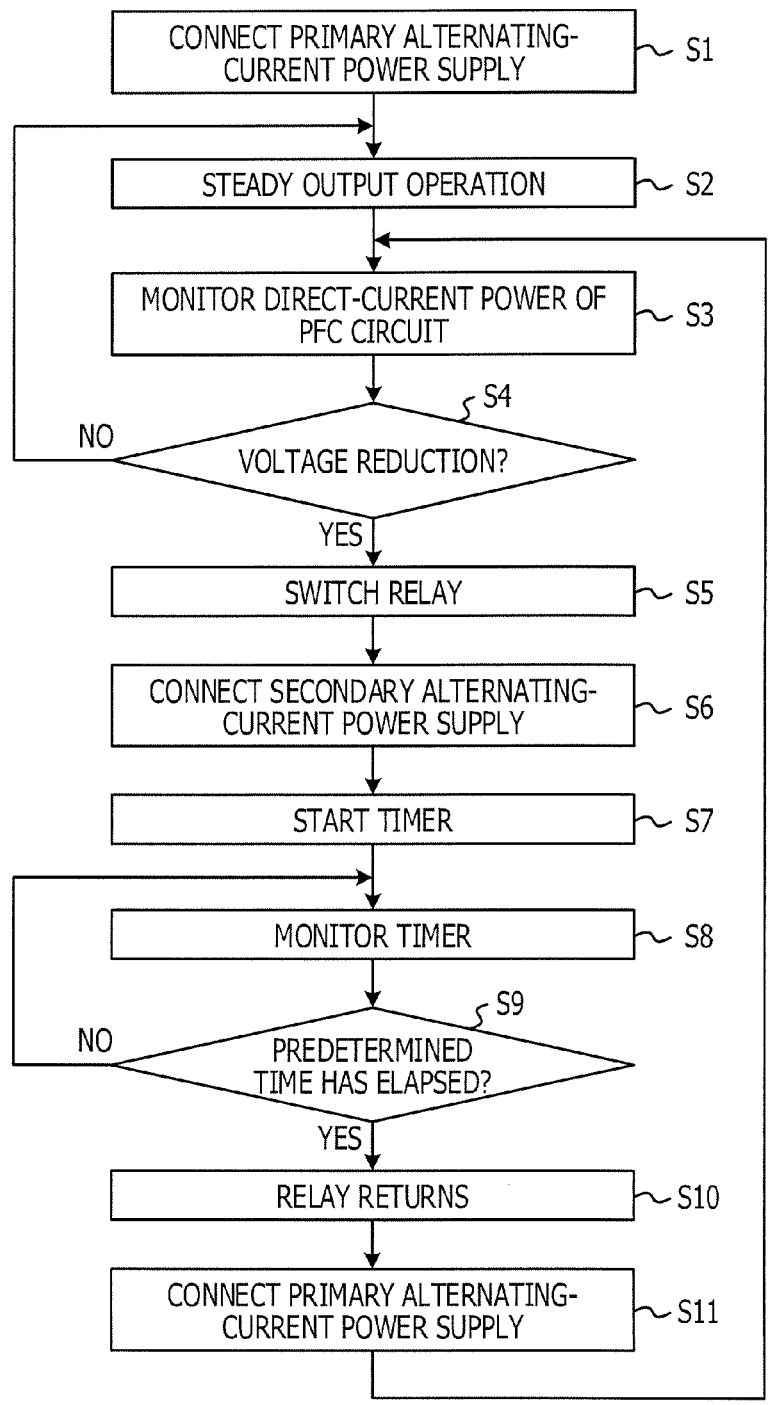
FIG. 8 is a flow chart of a procedure of the power supply unit of the first embodiment.

FIG. 8 is a flow chart of a procedure of the power supply unit 100 of the first embodiment.

First, in the power supply unit 100, the input terminal 110A and the output terminal 110C of the relay 110 are connected to each other, and hence, the primary alternating-current power supply outputting the alternating-current power A is connected (step S1).

Next, the power supply unit 100 performs a steady output operation for outputting the alternating-current power A from the output terminal 102 (step S2).

Next, using the control circuit 150, the direct-current power the PFC circuit 130 outputs is monitored (step S3).

In addition, based on the output of the comparator 165, the determination control unit 170 in the control circuit 150 determines whether or not a reduction in the voltage of the alternating-current power A occurs (step S4).

In a case where in the step S4 the determination control unit 170 detects that the output signal of the comparator 165 is changed from the L level to the H level, it is assumed that the voltage of the alternating-current power A is reduced (S4: YES), and the control circuit 150 switches the relay 110 (step S5).

As a result, the secondary alternating-current power supply outputting the alternating-current power B is connected to the output terminal 102 through the relay 110 (step S6).

Next, when outputting, to the relay coil 111, the driving signal of the signal level used for connecting the input terminal 110B and the output terminal 110C of the relay 110 to each other, the determination control unit 170 causes the timer 180 to start counting (step S7).

The timer 180 counts the predetermined time (step S8). The timer 180 determines whether or not counting the predetermined time is finished (step S9). The timer 180 repeats the processing operation in the step S9 until finishing counting the predetermined time.

If the signal indicating termination of counting is input from the timer 180, the determination control unit 170 switches the driving signal again, and outputs, to the relay coil 111, the driving signal of the signal level used for connecting the input terminal 110A and the output terminal 110C of the relay 110 to each other. From this, the connection state of the relay 110 returns to a state before the occurrence of the power failure (step S10).

As a result, the primary alternating-current power supply outputting the alternating-current power A is connected (step S11).

In addition, in a case where, in the step S4, the determination control unit 170 does not detect that the output signal of the comparator 165 changes from the L level to the H level, the steady operation in the step S2 is continued.

As above, according to the first embodiment, it is possible to provide the power supply unit 100 capable of detecting the high-speed power reduction and the low-speed power reduction using one comparator 165 in the control circuit 150 and switching the relay 110.

In the power supply unit 100, the alternating-current power A is converted into the direct-current power using the rectifier circuit 120 and the PFC circuit 130, and furthermore, the direct-current power that is voltage-divided by the attenuator 155 and from which a noise is removed using the LPF 160 is input to the inverting input terminal of the comparator 165. Accordingly, the power reduction of the alternating-current power A is detected.

In addition, the threshold voltage VTH input to the inverting input terminal of the comparator 165 is optimized so as to detect both the high-speed power reduction and the low-speed power reduction, and set to a value very close to the voltage value of the direct-current power input to the inverting input terminal.

Therefore, it is possible to detect both the high-speed power reduction and the low-speed power reduction using one comparator 165 in the control circuit 150, and it is possible to simplify a circuit configuration compared with an uninterruptible power supply unit of the related art. In addition, the circuit configuration of the power supply unit 100 is simpler than the power supply units 1A and 1B of the technical premise.

Therefore, according to the first embodiment, it is possible to provide the power supply unit 100 whose configuration is simple.

In addition, the reason why it is possible to detect both the high-speed power reduction and the low-speed power reduction using one comparator 165 in the control circuit 150 is that the alternating-current power is converted into the direct-current power using the rectifier circuit 120 and the PFC circuit 130 and the threshold voltage VTH having a value close to the direct-current voltage input to the inverting input terminal of the comparator 165 in a case where no power failure occurs is used.

In the power supply unit 100 of the first embodiment, by converting the alternating-current power A into the direct-current power in this way, it is possible to detect the high-speed power reduction and the low-speed power reduction using one detection circuit, and simplification of a device configuration is achieved.

In addition, since the alternating-current power is converted into the direct-current power of a given voltage using the rectifier circuit 120 and the PFC circuit 130, it is possible to detect power failures of types of alternating-current power of various voltage values and frequencies. Therefore, the power supply unit 100 does not have to be manufactured properly in accordance with the voltage value and the frequency of alternating-current power.

In other words, even if the voltage value of each of the two types of alternating-current power A and B is any value ranging, for example, from 80 V to 260 V, it is possible to detect a power failure using one type of power supply unit 100 and switch the relay 110.

This has a strong advantage over the power supply unit 1B of the technical premise (see FIG. 2) in which it is desirable that the LPFs 60H and 60L, values of the predetermined threshold voltages of the comparators 70H and 70L, and so forth are changed between, for example, a case where the voltage values of the two types of alternating-current power A and B are 100 V and a case where those thereof are 200 V.

Accordingly, it is possible to manufacture the power supply unit 100 at low cost.

In addition, since it is possible to supply electric power for the comparator 165, the determination control unit 170, the relay driver 175, and the timer 180 from the DC-DC converter 140, the power supply unit 100 does not have to include the control circuit power supply 55 (see FIG. 2) in such a manner as the power supply unit 1B of the technical premise.

From this, it is possible to reduce configuration elements of the power supply unit 100 and achieve simplification thereof.

While, in the above description, an example where the alternating-current power A is converted into the direct-current power using the rectifier circuit 120 and the PFC circuit 130 has been described, a smoothing capacitor may be used in place of the PFC circuit 130. In other words, by generating the direct-current power using the smoothing capacitor on the output side of the rectifier circuit 120 and monitoring, using the control circuit 150, the fluctuation of direct-current power output from the smoothing capacitor, the relay 110 may be switched.

In addition, in a case where, for example, the amount of electric power supplied from the output terminal 102 is intended to be increased, a semiconductor relay may be added in addition to the relay 110.

Here, using FIG. 9, a power supply unit 100A based on an example of a modification to the first embodiment will be described.

Figure 9:
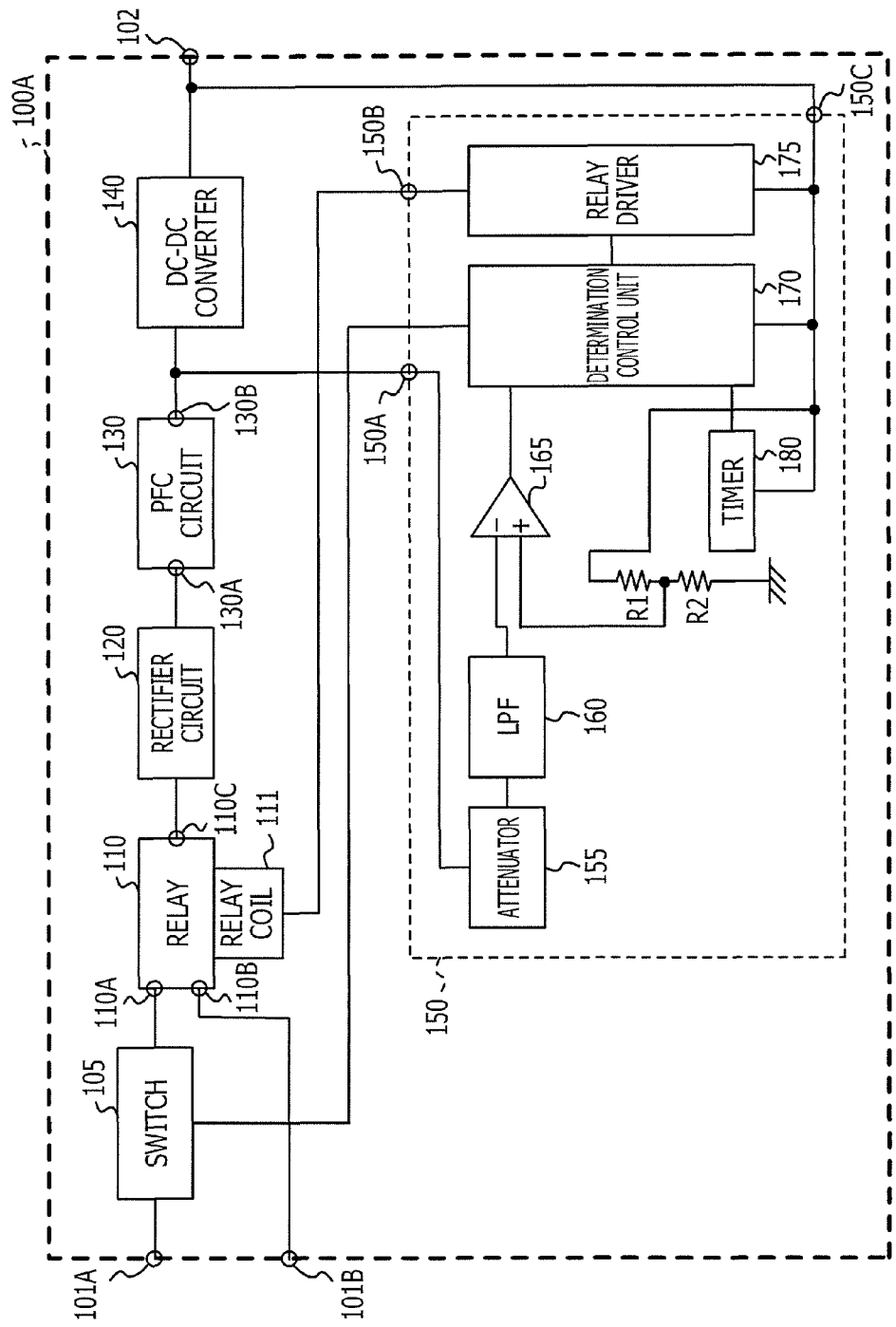
FIG. 9 is a diagram illustrating a power supply unit based on an example of a modification to the first embodiment.

FIG. 9 is a diagram illustrating the power supply unit 100A based on an example of a modification to the first embodiment.

The power supply unit 100A is obtained by adding a switch 105 to the power supply unit 100 illustrated in FIG. 4B.

The switch 105 is an alternate type of switch able to be caused to change over by a person from outside, and inserted in series between the input terminal 101A and the input terminal 110A of the relay 110.

If the switch 105 is caused to change over, the switch 105 is shut off and put into a non-conduction state. If the switch 105 is put into the non-conduction state, a signal indicating being put into the non-conduction state is input to a determination control unit 170A.

Such a switch 105 is provided so that when the alternating-current power A is put into a power failure and maintenance of the power supply unit 100A is performed, a worker does not get an electric shock even if being in contact with the input terminal 101A or the like.

While the signal indicating being put into the non-conduction state is input from the switch 105, the determination control unit 170A holds a state of connecting the input terminal 110B and the output terminal 110C to each other, so as not to connect the input terminal 110A and the output terminal 110C of the relay 110 to each other.

According to such a power supply unit 100A, at the time of a power failure of the alternating-current power A, it is possible to ensure the safety of the worker performing maintenance.

Second Embodiment

Figure 10:
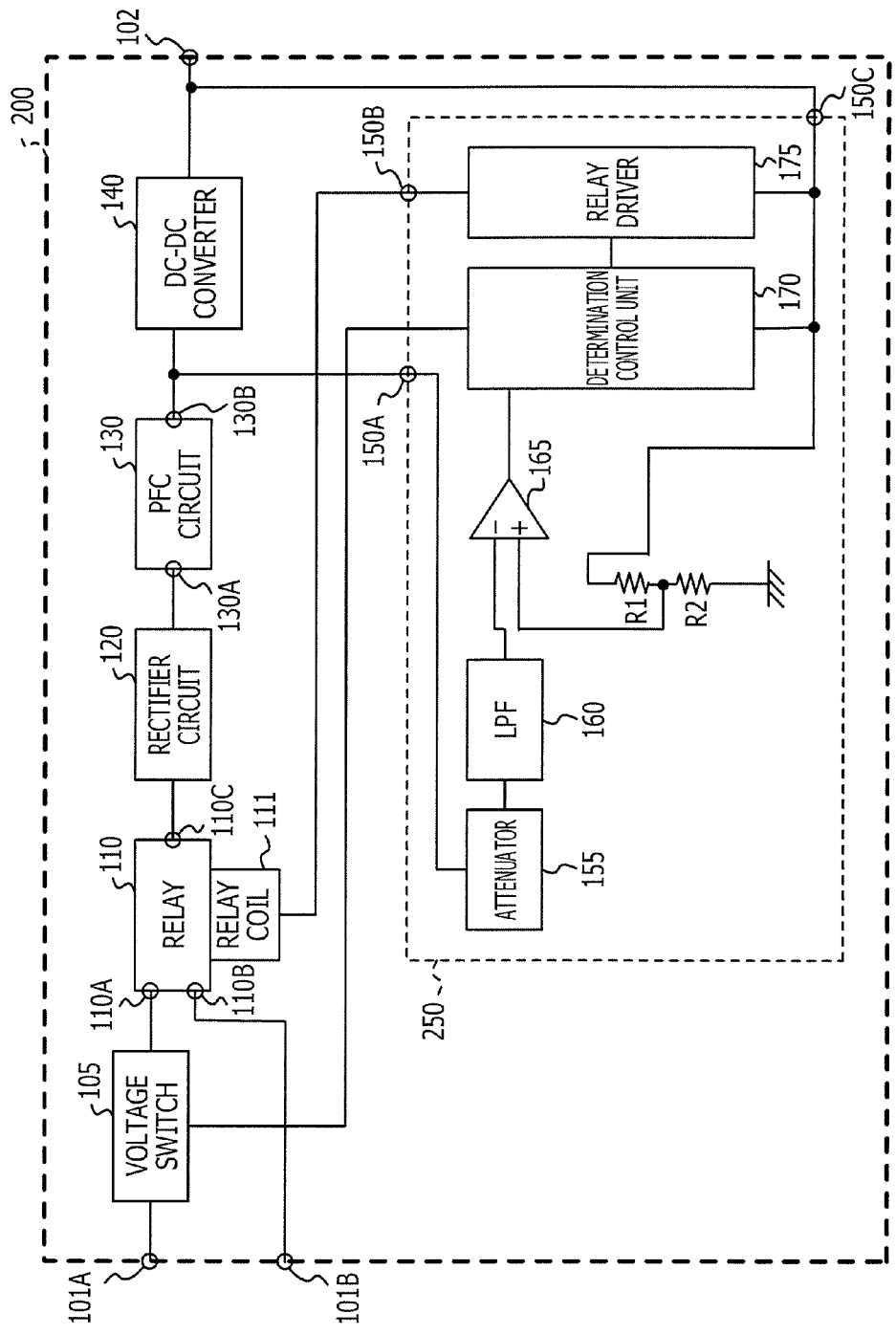
FIG. 10 is a diagram illustrating a power supply unit of a second embodiment.

FIG. 10 is a diagram illustrating a power supply unit 200 of a second embodiment.

The power supply unit 200 includes the input terminals 101A and 101B, the output terminal 102, the relay 110, the relay coil 111, the rectifier circuit 120, the PFC circuit 130, the DC-DC converter 140, a control circuit 250, and a voltage switch 210.

The power supply unit 200 is obtained by changing the control circuit 150 in the power supply unit 100 of the first embodiment (see FIG. 4B) to the control circuit 250 and adding the voltage switch 210.

The control circuit 250 is obtained by omitting the timer 180 from the control circuit of the first embodiment (see FIG. 4B) and replacing the determination control unit 170 with a determination control unit 270.

The other configuration is the same as the power supply unit 100 of the first embodiment. Accordingly, the same symbol is assigned to the same configuration element, and the description thereof is omitted.

The voltage switch 210 is inserted between the input terminal 101A to which the alternating-current power A is input and the input terminal 110A of the relay 110, and provided so as to detect the voltage value of the alternating-current power A.

The voltage switch 210 includes, for example, an alternating-current voltmeter and a reed switch. In addition, when the alternating-current voltmeter detects that the voltage value of the alternating-current power A has returned after a power failure of the alternating-current power A, the reed switch is turned on and the voltage switch 210 outputs, to the determination control unit 270, a signal indicating that the voltage value of the alternating-current power A has returned.

If the signal indicating that the voltage value of the alternating-current power A has returned is input to the determination control unit 270 by the voltage switch 210 when a power failure of the alternating-current power A occurs, the determination control unit 270 switches the relay 110, and the input terminal 110B and the output terminal 110C are connected to each other, the determination control unit 270 switches the driving signal output from the relay driver 175.

As a result, the relay 110 connects the input terminal 110A and the output terminal 110C to each other.

Therefore, according to the second embodiment, it is possible to supply the power supply unit 200 capable of returning the connection of the relay 110 after the return of the alternating-current power A, using the voltage switch 210 in place of the timer 180 (see FIG. 4B).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A power supply unit comprising:
    a relay that includes a first input terminal to which primary alternating-current power is input and a second input terminal to which secondary alternating-current power is input, and outputs one of the primary alternating-current power and the secondary alternating-current power;
    a first power conversion unit that is coupled to an output terminal of the relay, and converts alternating-current power output from the relay, into direct-current power;
    a second power conversion unit that is coupled to an output side of the first power conversion unit and converts output power of the first power conversion unit into direct-current power of a predetermined voltage;
    a power output terminal that outputs the direct-current power converted by the second power conversion unit; and
    a control unit that couples the first input terminal to the output terminal when a voltage of output power of the first power conversion unit is greater than or equal to a predetermined threshold value, and couples the second input terminal to the output terminal when the voltage of the output power of the first power conversion unit becomes less than a predetermined threshold value.

2. The power supply unit according to claim 1, wherein the first power conversion unit includes
    a rectifier circuit that full-wave rectifies the primary alternating-current power or the secondary alternating-current power output from the relay, and
    a power factor correction circuit that is coupled to an output side of the rectifier circuit and corrects a power factor of electric power full-wave rectified by the rectifier circuit, wherein
    the second power conversion unit is coupled to an output side of the power factor correction circuit and converts output power of the power factor correction circuit into direct-current power of a predetermined voltage, and
    the control unit couples the first input terminal to the output terminal when a voltage of the output power of the power factor correction circuit is greater than or equal to a predetermined threshold value, and couples the second input terminal to the output terminal when the voltage of the output power of the power factor correction circuit becomes less than a predetermined threshold value.

3. The power supply unit according to claim 2, wherein the control unit includes
    an attenuation circuit that attenuates the output power of the power factor correction circuit,
    a low pass filter coupled to an output side of the attenuation circuit,
    a comparator that compares a signal level of a signal input from the low pass filter with a predetermined threshold value;
    a determination unit that determines, based on an output of the comparator, whether or not the voltage of the output power of the power factor correction circuit is less than the predetermined threshold value, and
    a switching drive unit that switches the relay, based on a determination result of the determination unit.

4. The power supply unit according to claim 3, wherein the control unit further includes
    a timer that measures an elapsed time after the determination unit determines that the voltage of the output power of the power factor correction circuit is less than the predetermined threshold value, wherein
    when the timer finishes measuring a predetermined time, the switching drive unit is caused to couple the first input terminal to the output terminal.

5. The power supply unit according to claim 3, further comprising:
    a voltage detection unit that detects a voltage value of the primary alternating-current power input to the first input terminal, wherein
    when a voltage value detected by the voltage detection unit becomes greater than or equal to a predetermined voltage value after the switching drive unit couples the second input terminal to the output terminal, the control unit causes the switching drive unit to couple the first input terminal to the output terminal.

6. The power supply unit according to claim 1, wherein one information processing device is coupled to the power output terminal.

7. The power supply unit according to claim 1, wherein the relay is a mechanical relay.

8. The power supply unit according to claim 1, further comprising:
    a switch that is provided on an input side with respect to the first input terminal of the relay and causes the control unit to hold a state of coupling the second input terminal to the output terminal.

* * * * *